Dec. 31, 1968  B. J. OZERO  3,419,629
PREPARATION OF VINYL CHLORIDE
Filed Dec. 17, 1965

INVENTOR
BRIAN J. OZERO
BY
Barry Leonard Evans
AGENT

United States Patent Office 3,419,629
Patented Dec. 31, 1968

3,419,629
PREPARATION OF VINYL CHLORIDE
Brian J. Ozero, New York, N.Y., assignor to Halcon International, Inc., a corporation of Delaware
Filed Dec. 17, 1965, Ser. No. 514,508
7 Claims. (Cl. 260—656)

ABSTRACT OF THE DISCLOSURE

The invention is directed to an organic chemical process wherein an absorption operation is employed to remove at least one component of a vapor stream containing several components. In particular, the invention concerns an improved absorption technique for separating the vapor effluent from the thermal cracking of 1,2-dichloroethane into an organic free hydrogen chloride stream and a hydrogen chloride free solution of mono-vinyl chloride in 1,2-dichloroethane. The characterizing feature of the inventive process resides in the saturation of the 1,2-dichloroethane absorption medium with hydrogen chloride prior to its utilization in the absorption operation. Practice of the invention is attended by improved efficiency, obviation of temperature rise due to absorption of light components, minimization of the amount of absorption medium required, minimization of absorption pressure and reduction in the amount of cooling or refrigeration required for the absorption medium stream.

---

Figure 1:
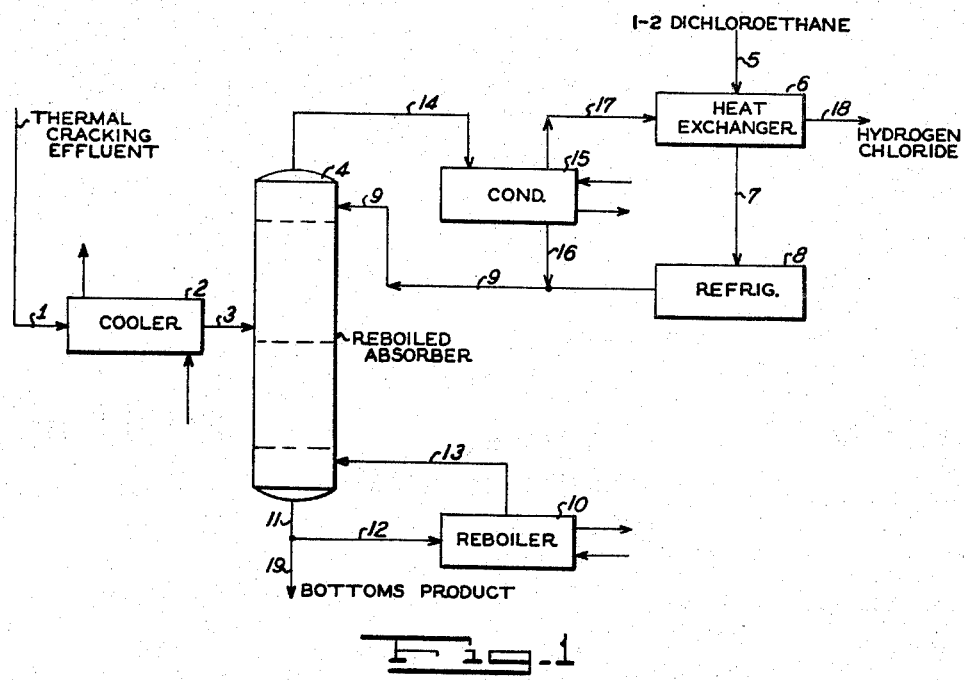

This invention relates generally to organic chemical processes wherein an absorption operation is employed to remove at least one component of a vapor stream containing several components. More specifically it relates to a process wherein the vapor pressure of the component or components which are removed in the absorption operation are less than the vapor pressure of at least one other component in the vapor mixture. Even more specifically this invention relates to a process wherein the absorption medium used to selectively absorb from the vapor mixture the component or components having vapor pressures less than the lightest component in the vapor mixture, is treated in order to increase the efficiency of the absorption operation.

The selective absorption of a component of a vapor mixture from the mixture is well known to the chemical process arts. Typically, where it is desired to remove one particular component an absorption medium is chosen which selectively absorbs the desired component and does not absorb the other components in the vapor mixture. For example, potassium carbonate is often chosen as the selective absorption medium for the removal of carbon dioxide from oxygen or nitrogen streams.

In organic processes it is often difficult to find an absorption medium which will selectively absorb one specific component while having no absorption effect upon the others. In vapor mixtures of similar chemical compounds any given absorption medium will absorb to some degree all of the components in the vapor mixture. Generally, the lighter components, that is, those with the higher vapor pressures are absorbed to a lesser degree than the heavier components. To accomplish the selective absorption of one component, for example, an intermediate boiling component, it is necessary to control process temperatures and pressures to minimize the absorption of the lighter components. It is inevitable, however, that there will be some absorption of the lighter components.

The absorption medium from such an operation, rich in both the desired component and in the lighter components is usually further processed in a stripping operation wherein the lighter components are removed. The stripped absorption medium, containing only the desired components, is then subjected to distillation or other unit operations whereby the desired component is removed from the absorption medium. The lean absorption medium is then reused in the absorption operation.

Where the lightest component in the vapor mixture is very much lighter than the component to be absorbed or present only in minor proportions the effect of its absorption upon the absorption medium is negligible. The amount of light component absorbed is small and there is no significant increase in either the size of the absorption medium stream nor is there any appreciable heat effect. However, where the vapor pressure of the light component is not very different from the component to be absorbed, or though much lighter is present in substantial amounts, large quantities of that component are absorbed in the lean absorption medium and heat effects may have a significant bearing upon the efficiency of the absorption.

The primary effect of absorbing light components is to raise the temperature of the absorption medium; the latent heat of condensation of the light component appears as a sensible heat increase of the absorption stream. This reduces the amount of heavy component which can be absorbed per unit flow of absorption medium at a given process pressure. If the process pressure or liquid to vapor ratio is increased to offset the temperature effect of the condensation of light component, additional process and equipment costs are incurred.

It is the prime purpose of this invention to provide a technique whereby the negative process effects caused by the absorption, in an absorption medium, of light components in a vapor mixture from which a heavier component is to be removed, is minimized.

More specifically, it is desired to provide a method whereby the temperature rise of the lean absorption medium due to absorption of light components is obviated.

It is a further primary purpose of this invention to provide a process technique which will decrease the amount of absorption medium required to absorb from the vapor mixture the desired quantity of heavier component.

It is further desired to provide techniques whereby the pressure of absorption operations can be minimized without sacrificing the efficiency of the absorption.

It has been discovered that the foregoing objectives can be effectively accomplished if the absorption medium is saturated with light component and simultaneously cooled to remove the latent heat of condensation of light component prior to introduction of the absorption medium into the absorption zone.

It has been found that if the absorption medium is saturated with light component there is no condensation of light component in the absorption zone and therefore no heat effect. On the contrary it has been found, that, if the absorption medium is saturated at a low temperature with light component, and there is a temperature rise of the absorption medium due to absorption of heavy component, there is a vaporization of light component which causes a depletion of the heat content of the total stream. This counteracts the temperature rise of the absorption medium and increases the efficiency of the absorption operation.

It has been found that by pre-saturating the absorption medium as herein described it is possible to drastically reduce the amount of cooling or refrigeration which may be required for that stream. Corresponding reductions in equipment sizes and operating costs in the absorption and stripping operations are achieved.

Another considerable process benefit derived from operating as herein described is that the absorption pressure can be significantly reduced avoiding thereby the problems of vapor compression.

Still a further advantage of the process is that the low pressure of the absorption may permit the incorporation of an absorber-stripper into the absorption scheme; that is, the stripping and absorption operation may be accomplished in a single process unit operating at a single pressure. Heretofore the high absorption pressures and/or the high absorption medium ratio required to offset the heat effects caused by the condensation of light component in the absorption medium precluded a stripping operation at the same pressure for processes wherein the product degraded at the high reboiler temperatures that would result.

Still a further advantage of the pre-saturation scheme is the reduction of the pressure and temperature in the reboiler of the combined absorber-stripper thereby allowing the use of process vapors or atmospheric steam which otherwise would have been unavailable as a heat medium.

A still further advantage of this process applies to processes which require an extremely low temperature absorption medium. In such processes, the temperature steadying effects of absorption medium pre-saturation may raise the level of refrigeration required and so materially reduce capital investment.

The lean absorption medium can be saturated with light component in many types of process equipment. One of the more effective methods of saturating the absorption medium is to contact it with the light component in a co-current condenser contactor wherein the absorption takes place simultaneously with the removal of the heat of condensation. Other vapor-liquid contact devices in combination with heat exchange equipment can be used as well. It is of course not necessary to saturate the absorption medium with light component. Some benefits can be obtained through contact even though the absorption medium is less than saturated.

The pre-saturation process is applicable to any absorption operation wherein it is desired to selectively absorb a heavy component from a light component and the light component is absorbed to a substantial degree in the absorption medium. This process has been developed for example, in conjunction with the design of chemical process plants for the manufacture of mono-vinyl chloride from ethylene.

The first step in this process is the chlorination of ethylene to produce 1,2-dichloroethane. The dichloroethane is thermally cracked to produce mono-vinyl chloride and hydrogen chloride. The vapor mixture of mono-vinyl chloride, hydrogen chloride, unconverted, 1,2-dichloroethane and other side products is then further processed to prepare two products: an organic-free hydrogen chloride stream and a hydrogen chloride free mono-vinyl chloride-dichloroethane stream. The latter is subsequently separated into its two components; a vinylchloride product stream and a 1,2-dichloroethane recycle stream.

The effluent of the thermal cracker is separated in a combination absorber-stripper. The hydrogen chloride is the light component in the vapor; the mono-vinyl chloride has an intermediate vapor pressure; the 1,2-dichloroethane is the heavy component.

FIGURE 1 is a schematic process flow-sheet which depicts the process scheme whereby the several components of the thermal cracking vapor mixture were separated prior to the present invention.

The vapor effluent from a thermal cracking furnace, not shown, is introduced via line 1 to vapor cooler 2 wherein the vapor is cooled and a portion of the stream condensed. The cooled vapor-liquid mixture passes via line 3 to reboiled absorber column 4, a column which performs the dual functions of absorption and stripping. Reboiled absorber column 4 is a standard distillation type column containing approximately 60 trays for vapor liquid contact. The function of the column is to remove, as an overhead product, an organic-free hydrogen chloride vapor product and as a bottoms product, a hydrogen chloride-free mixture of 1,2-dichloroethane and vinyl chloride. As will be shown below in Example I, the vapor mixture fed to reboiled absorber 4 contains uncracked 1,2-dichloroethane, hydrogen chloride, vinyl chloride and other organic side products.

The absorber section of column 4 is refluxed with a refrigerated stream of relatively pure 1,2-dichloroethane. The 1,2-dichloroethane is introduced to the process via line 5, passes countercurrent to the hydrogen chloride product stream in heat exchanger 6 and then passes via line 7 to refrigerator 8. In refrigerator 8 the temperature of the 1,2-dichloroethane is reduced and the chilled stream is passed via line 9 to the first tray in reboiled absorber 4.

Heat energy is supplied for the stripping part of the operation in reboiler 10. A stream of bottoms product passes via lines 11 and 12 to thermosyphon reboiler 10 wherein it is partially vaporized; the mixed liquid and vapor passes via line 13 back to reboiled absorber 4. A thermosyphon reboiler is used to prevent heat degradation of the organic materials.

The vapor-liquid contact is accomplished in the reboiled absorber and the overhead vapor stream is hydrogen chloride which is substantially free of vinyl chloride and contains only a small quantity of 1,2-dichloroethane. The hydrogen chloride is removed via line 14 and passes to overhead condenser 15 wherein it is further refrigerated to condense out most of the 1,2-dichloroethane remaining. The 1,2-dichloroethane condensate from condenser 15 passes via line 16 to line 9 and is returned to column 4. The substantially pure hydrogen chloride stream then passes via line 17 through heat exchanger 6 and is removed from the process via line 18. The bottoms product from the column comprising a hydrogen chloride-free solution of vinyl chloride in 1,2-dichloroethane passes from the process via line 19.

The following example shows a typical material balance for the reboiled absorber described above. The material balance corresponds to a 200 million pound/year production unit. The numbers on the several process streams are those in FIGURE 1.

EXAMPLE I

|  | Feed, Mols/ Hour | Absorption Medium, Mols/Hour | Overhead Product, Mols/Hour | Bottoms Product, Mols/Hour |
| --- | --- | --- | --- | --- |
| Stream No | 1 | 5 | 18 | 19 |
| Component: |  |  |  |  |
| Hydrogen chloride | 403.8 |  | 403.8 | (¹) |
| Mono-vinyl chloride | 403.4 | 3.4 | 0.7 | 406.1 |
| 1,2-dichloroethane | 304.0 | 423.0 | 0.3 | 726.7 |
| Trichloroethane | 2.9 | 10.3 |  | 13.2 |
| Total | 1,114.1 | 436.7 | 404.8 | 1,146.0 |

¹ 5 p.p.m.

Figure 2:
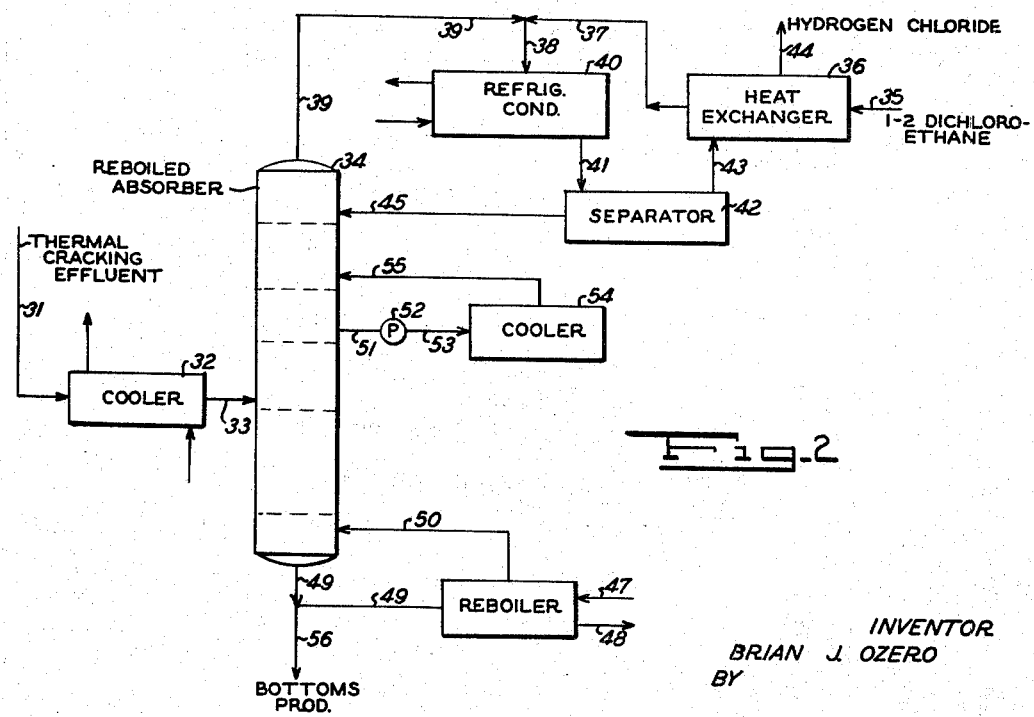

FIGURE 2 is a process flow sheet disclosing the invention described herein. The overall process result is the same as that in FIGURE 1, that is, the hydrogen chloride and vinyl chloride in the thermal-cracking effluent are separated in a reboiled absorber; however, by presaturating the 1,2-dichloroethane reflux with hydrogen chloride prior to its introduction into the reboiled absorber substantial economies are achieved.

The thermal cracking reactor effluent is introduced via line 31 to cooler 32 wherein the vapor is cooled and a portion condensed. The vapor-liquid mixture passes via line 33 to reboiled absorber 34 wherein the above described separation of components takes place.

The absorption medium, 1,2-dichloroethane is introduced into the process via line 35. It passes through heat exchanger 36 countercurrent to the hydrogen chloride product stream. The cooled 1,2-dichloroethane then passes via line 37 to line 38. It is mixed in line 38 with the entire overhead product vapor from reboiled absorber 34. The mixture of hydrogen chloride vapor and cooled 1,2-dichloroethane absorption medium passes via line 38 to co-current refrigerator-condenser 40. In refrigerator-condenser 40 the heat of absorption of the hydrogen chloride in 1,2-dichloroethane is removed and the hydrogen chloride saturated, 1,2-dichloroethane stream is further chilled.

The chilled saturated stream passes via line 41 to vapor liquid separator 42. The uncondensed hydrogen chloride passes via line 43 to heat exchanger 36 wherein it cools the 1,2-dichloroethane and then passes via line 44 out of the process. The chilled, saturated absorption medium passes via line 45 to reboiled absorber 34.

The heat energy for the stripping is supplied via thermosyphon reboiler 46. Since, as will be further demonstrated in Example 2, the improved process requires substantially less absorption medium, a more concentrated vinyl chloride solution is formed and the temperature in the bottom of the reboiled absorber is much lower than in the old scheme. This permits the heat energy to be supplied via another process stream or via atmospheric steam which might otherwise have to be vented. For example, the overhead vapor from the column which separates heavy side products from 1,2-dichloroethane may be condensed in the reboiler. The vapor from this column is introduced to the reboiler via line 47 and condensate is removed via line 48. As is conventional, a stream of bottoms product is removed via line 49, is vaporized in reboiler 46 and is subsequently returned to the reboiled absorber via line 50. The hydrogen chloride-free vinyl chloride solution is removed as a bottoms product via line 56.

An optional feature which is but a separate embodiment of the basic invention may be included to further decrease the size of the 1,2-dichloroethane absorption stream. A stream of absorption medium is removed from a tray of the absorption section of reboiled absorber 34. The stream is cooled and returned to a tray higher in the absorption section. For example, a stream of absorption medium is removed via line 51 and pumped via pump 52 and line 53 to cooler 54 and then returned via line 55 to reboiled absorber 34. The cold stream will then absorb more hydrogen chloride which upon subsequent vaporization in the column will tend to limit any temperature rise in the column due to absorption of mono-vinyl chloride.

The following process example demonstrates the significant advantages of incorporating the presaturation scheme disclosed herein. The stream numbers correspond to those on FIGURE 2 discussed above.

EXAMPLE III

| Equipment | Size or Duty of Equipment Old Process, B.t.u./hr. | Size or Duty of Equipment New Process, B.t.u./hr. |
|---|---|---|
| Feed Cooler | 9,000,000 | 5,870,000 |
| Overhead condenser | 190,000 | 922,000 |
| Refrigerator | 1,600,000 | |
| Overhead heat exchanger | 200,000 | 180,000 |
| Side stream cooler | | 273,000 |
| Reboiler | 10,000,000 | 5,400,000 |
| Absorber stripper, diameter/length | 6'0"/110'0" | 4'0"/86'0" |
| Utilities; Refrigeration Level: | | |
| −30° F., tons | 434 | 100 |
| 0° F., tons | 208 | 227 |
| 35° F., tons | 258 | 261 |
| Total, tons | 900 | 588 |
| Low Pressure Steam, lb./hr | 10,500 | 0 |

The following example compares the equipment sizes and utility requirements for the two process examples above.

EXAMPLE II

| | Feed, Mols/Hour | Absorption Medium, Mols/Hour | Overhead Product, Mols/Hour | Bottoms Product, Mols/Hour |
|---|---|---|---|---|
| Stream No | 31 | 35 | 44 | 56 |
| Component: | | | | |
| Hydrogen chloride | 403.8 | | 403.8 | (1) |
| Mono-vinyl chloride | 404.4 | .3 | .7 | 402.9 |
| 1,2-dichloroethane | 304.0 | 117.3 | .3 | 421.0 |
| Trichloroethane | 2.9 | .5 | | 3.4 |
| Total | 1,114.1 | 118.1 | 404.8 | 827.3 |

1 5 p.p.m.

As the following examples set forth the presaturation method is particularly effective when applied to the separation of mono-vinyl chloride from the effluent of the thermal cracking reactor. To decrease the heat load of the refrigerated overhead condenser of the absorber-stripper it is necessary to cool and refrigerate the thermal cracking effluent prior to its introduction into the absorber-stripper. The vapor mixture can be cooled to ambient temperature but better results are achieved if it is cooled to less than 50° F. and even better results are obtained when the effluent is cooled to about 10° F.

The pressure at which the absorber stripper operates is determined by balancing the gains in absorption efficiency at higher pressures against the losses in column inventory caused by chemical degradation at the high reboiler temperatures caused by high column pressure. It has been discovered that good results are obtained at column pressures in the range of 10 p.s.i.g. to 85 p.s.i.g. Better results are obtained where the pressure is from 25 p.s.i.g. to 75 p.s.i.g. and the most efficient operation is in the range of 40 p.s.i.g. to 60 p.s.i.g. It is desirable to maintain a low enough pressure in the column to permit the use of a dichloroethane column (the column which separates dichloroethane from heavier side products) overhead vapor or atmospheric steam in the reboiler. Since the bottoms temperature depends as much upon the flow of absorption medium, 1,2-dichloroethane, as it does upon the column pressure it is the task of those skilled in the art to balance the several variables in order to achieve maximum overall efficiencies. It has been found that the bottoms temperature in the absorber-stripper should not exceed about 220° F. in order to avoid degradation of the chemical inventory therein.

The level to which the absorption medium is cooled and refrigerated also depends upon the discretion of those skilled in the art. It has been found that if the absorption medium is cooled to −40 to +20° F. while being contacted with hydrogen chloride in the overhead condenser good results are obtained. Better results are obtained if the 1,2-dichloroethane is refrigerated to —30 to 0° F. and the best results are obtained when that stream is refrigerated to —25 to —15° F. Where the absorption medium is saturated with hydrogen chloride less refrigeration is required.

The flow of 1,2-dichloroethane absorption medium depends upon the column pressure, the level to which the 1,2-dichloroethane is refrigerated and saturated with hydrogen chloride and the amount of mono-vinyl chloride in the thermal cracking reactor effluent. Generally, it has been found that a flow rate of 0.1 to 2.0 mols of 1,2-dichloroethane per mol of mono-vinyl chloride feed insure satisfactory absorber-stripper operation. Better results are obtained if the 1,2-dichloroethane flow rate is from 0.15 to 1.2 mols per mol of mono-vinyl chloride feed and best results are obtained if from 0.2 to 0.4 mol are used.

From the foregoing discussion those skilled in the art should be able to design absorption operations incorporating the presaturation scheme to satisfy their own process requirements. The invention is intended to embrace all variations and modifications of the basic process scheme disclosed herein except as do not come within the scope of the appended claims.

What is claimed is:

1. In a process for the production of mono-vinyl chloride by the thermal cracking of 1,2-dichloroethane wherein the vapor effluent from the thermal cracking is separated into an organic free hydrogen chloride stream and a hydrogen chloride free solution of mono-vinyl chloride in 1,2-dichloroethane, the improvement comprising cooling the vapor effluent to at least ambient temperature, introducing the cooled effluent to an absorber column operating at a pressure of 10 to 85 p.s.i.g. and having a bottoms temperature not exceeding about 220° F., and scrubbing the introduced effluent with a stream of 1,2-dichloroethane which prior to the absorption operation has been saturated with hydrogen chloride.

2. A process as recited in claim 1 wherein the 1,2-dichloroethane absorption medium is simultaneously cooled and contacted with the hydrogen chloride prior to its introduction into the absorption column.

3. A process as recited in claim 2 wherein the simultaneous cooling and contacting takes place in a cocurrent overhead condenser.

4. A process as recited in claim 1 wherein the feed to the absorption column is cooled to less than 50° F. and the hydrogen chloride contacted, 1,2-dichloroethane is cooled to —40 to +20° F.

5. A process as recited in claim 4 wherein 0.1 to 2.0 mols of 1,2-dichloroethane are used per mol of mono-vinyl chloride in the feed.

6. A process as recited in claim 1 wherein hydrogen chloride is stripped from the mono-vinyl chloride in 1,2-dichloroethane solution in a stripping zone incorporated into the same process vessel in which the absorption operation takes place.

7. A process as recited in claim 6 wherein the overhead from the dichloroethane column is used as a source of heat for the reboiler which supplies vapor to the stripping zone of the combined absorber-stripper unit.

References Cited

FOREIGN PATENTS 462,044  12/1949  Canada.

LEON ZITVER, *Primary Examiner.*

J. BOSKA, *Assistant Examiner.*